UNITED STATES PATENT OFFICE.

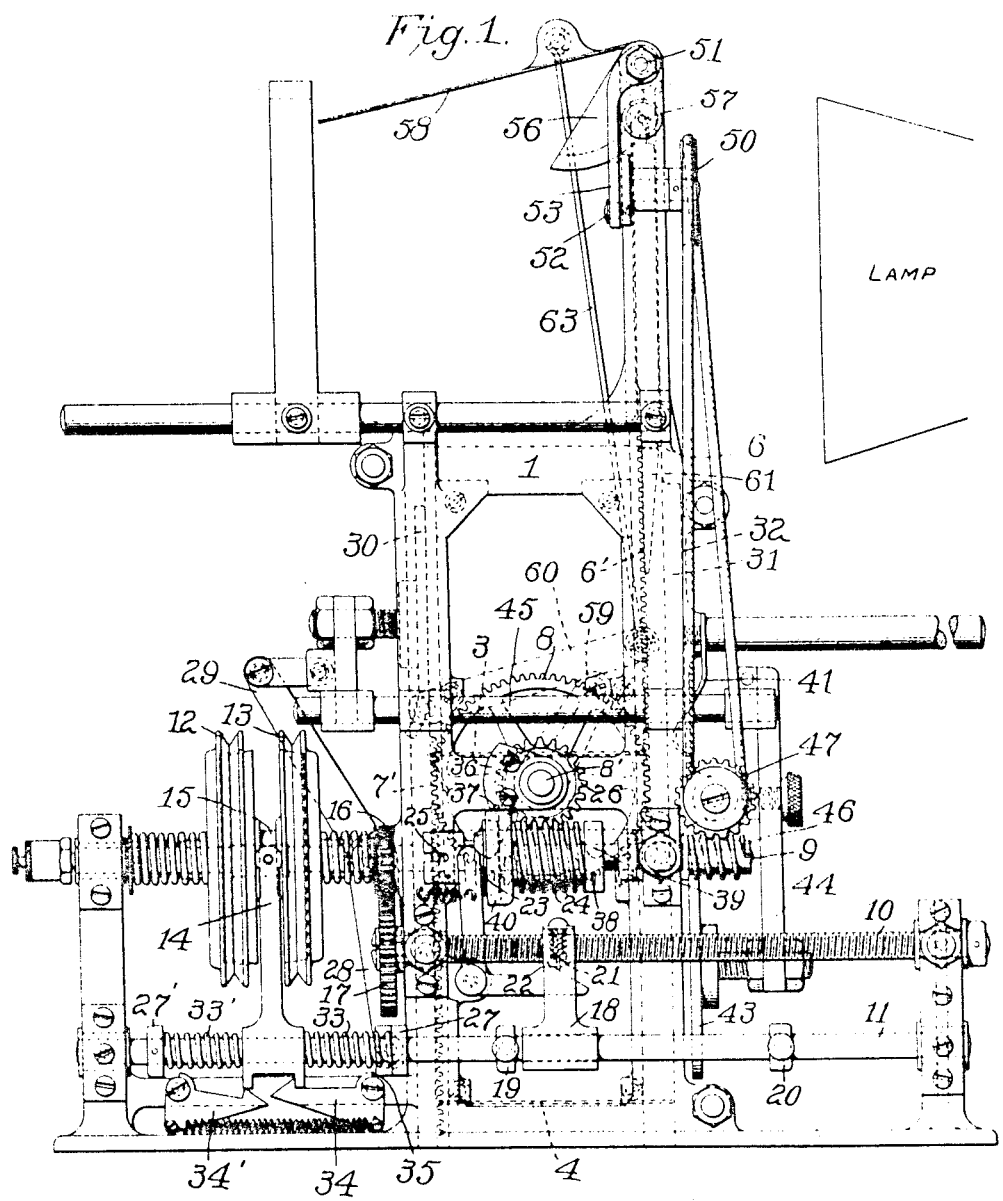

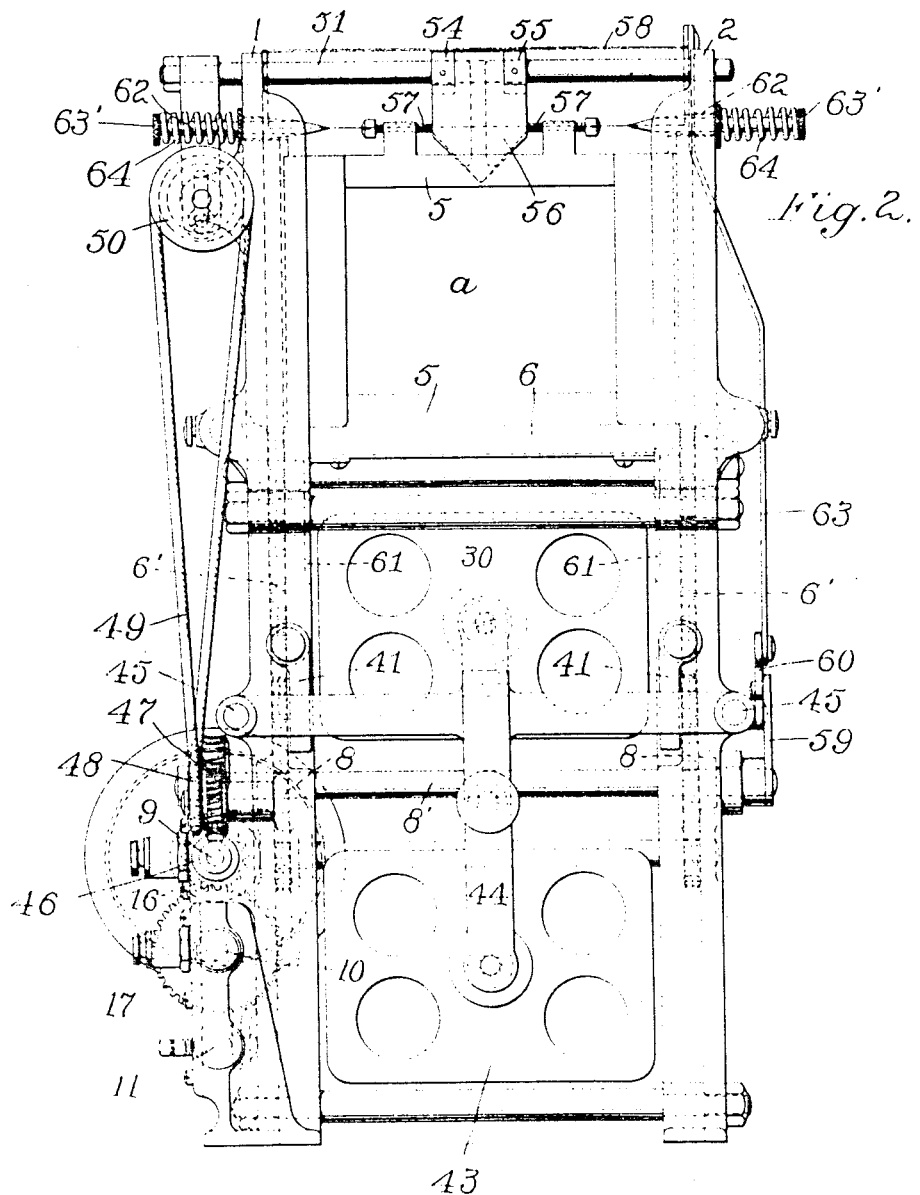

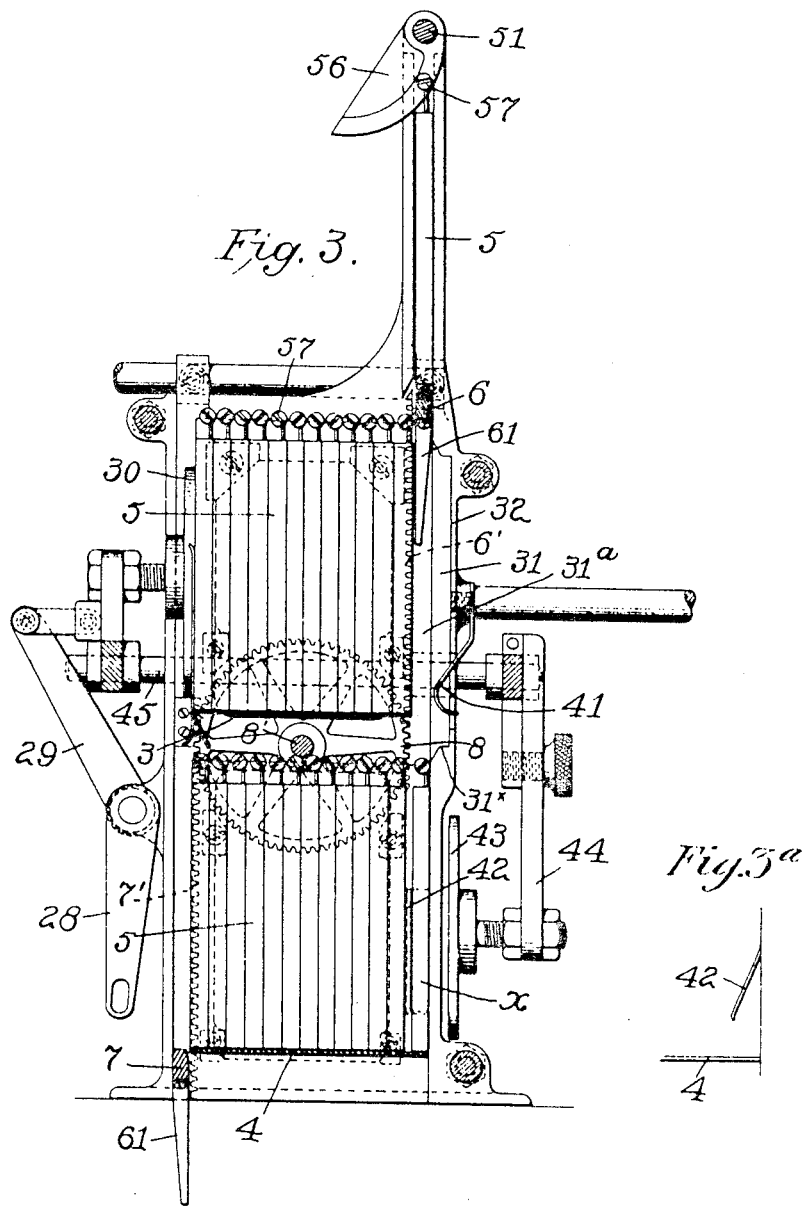

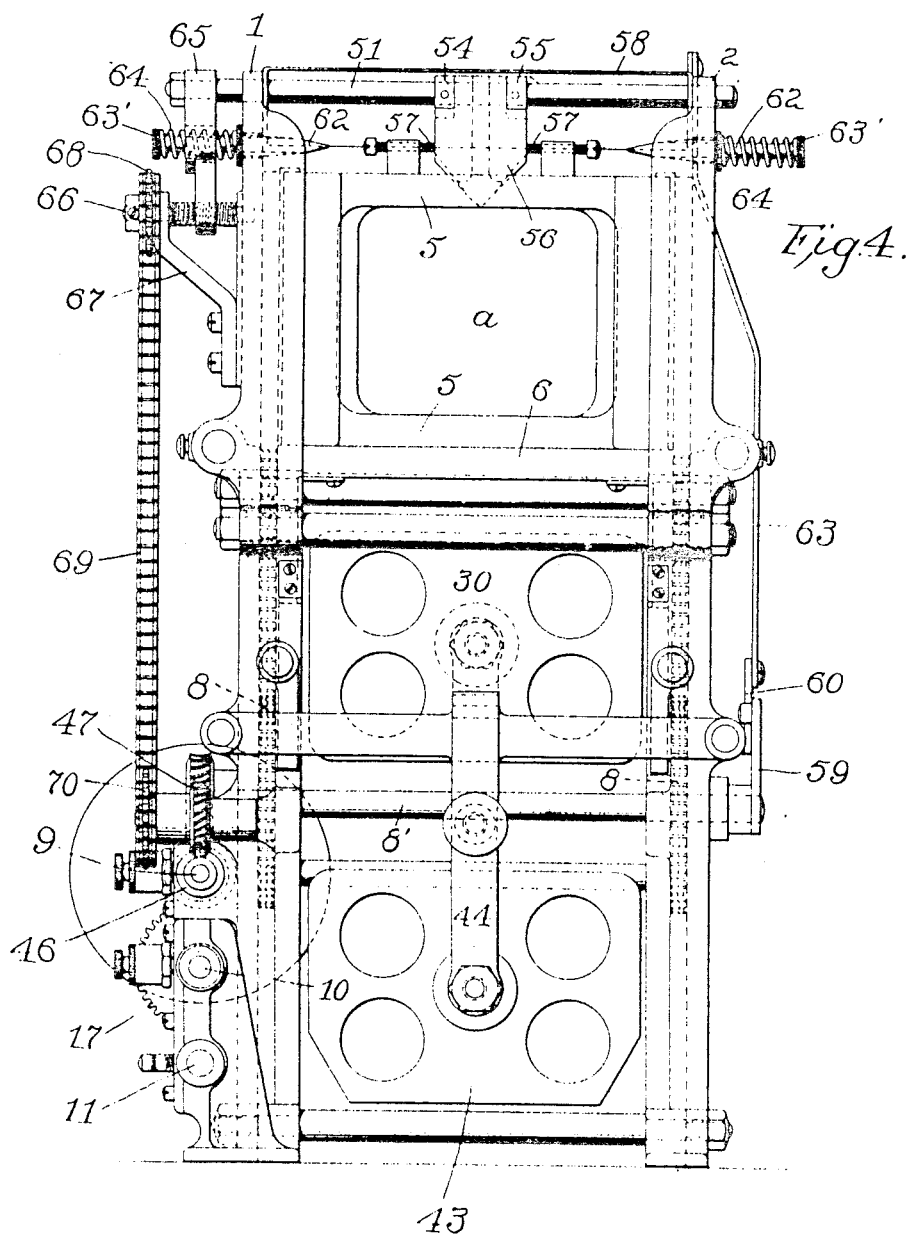

SYDNEY B. AUSTIN, OF BALTIMORE, MARYLAND, ASSIGNOR, BY MESNE ASSIGNMENTS, TO MOTT-LE-GAIGE ANIMATED ADVERTISING CORPORATION, OF NEW YORK, N. Y.

AUTOMATIC DISPLAY APPARATUS FOR LANTERN-SLIDES.

1,111,636.  Specification of Letters Patent.  Patented Sept. 22, 1914.

Application filed October 1, 1913. Serial No. 792,835.

*To all whom it may concern:*

Be it known that I, SYDNEY B. AUSTIN, citizen of the United States, residing at Baltimore, Maryland, have invented certain new and useful Improvements in Automatic Display Apparatus for Lantern-Slides, of which the following is a specification.

The invention relates to apparatus for handling lantern slides and particularly of the type disclosed in Letters Patent of the United States granted to A. S. Spiegel July 8, 1913, No. 1,066,765. In a lantern slide of this type the screen member and a picture carrying member are assembled in such relation that the movement of one relatively to the other member will cause to be displayed different parts of the composite picture to give a motion picture effect.

My present machine is designed to bring the lantern slides in order automatically to the display point and to operate each slide automatically when it is at the display point, so that by having a machine capable of holding a number of slides the operation of displaying one slide after another and producing the motion picture effect from each slide, when at the display point, may be carried out automatically without attention on the part of an operator.

In the accompanying drawings Figure 1 is a side elevation of a machine embodying my invention, Fig. 2 is a front elevation looking from the right of Fig. 1, and Fig. 3 is a sectional view looking from the same direction as Fig. 1. Fig. 3ª shows diagrammatically a detail of the springs 42 and their relation to the trough 4. Fig. 4 is a view similar to Fig. 2, differing only in showing a modified form of drive.

The main body of the machine consists of two frames 1, 2 between which are hung two troughs 3, 4. The lantern slides to be exhibited are made up of transparent members *a* and metal holders 5 which are placed in these troughs. Also slidably mounted between the frames are two elevators 6, 7, each consisting of a horizontal bar mounted between two uprights having rack teeth 6', 7' on their edges which engage the gears 8 on the shaft 8'. The driving mechanism consists of the shafts 9, 10, 11 and the gears etc. mounted on them. The pulleys 12, 13 are driven in opposite direction from a motor. Between them is a friction clutch device consisting of the yoke 14 and the clutch 15. This clutch is free to move longitudinally on the shaft 9 but is keyed to the shaft so that said shaft will be driven forward or backward as the clutch collar is in engagement with one or the other of the pulleys. The shaft 10 is driven from the shaft 9 through the gears 16, 17 and is threaded with a left hand thread throughout its length between its bearings. The traveler 18 has a female thread in its upper end engaging the thread on shaft 10 and is free to slide on the shaft 11 between the adjustable collars 19, 20.

Starting with the elevators in the position shown, that is with 6 in its upper or exhibiting position and 7 down at the left hand end of trough 4 and with a lantern slide in each elevator and with the traveler 18 near the collar 19, the pulley 13 drives the shaft 10 in such direction that the traveler 18 is moved leftward. On the head of the traveler is a spring plunger 21 adapted to engage a lever 22 pivoted to the frame. As the plunger strikes the lever 22 and operates it the upright arm 22' of the lever moves the friction clutch 23 to engage the worm 24 and causes it to rotate with the shaft 9, because clutch 23 is splined to the shaft by pin and slot 25. This worm acting through the worm gear 26 and gears 8 on the cross shaft 8' and the racks on the elevators, raises the elevator 7 to a position at the left hand end of trough 3 and lowers the elevator 6, with the slide thereon (which has just been exhibited), to a position opposite the right end of the same trough 3. The traveler 18 moving farther to the left strikes collar 19 and so moves shaft 11 to the left. A pin or screw on the collar 27 connects with lever arm 28 and causes said lever to move to the left, and through lever arm 29 moves plunger 30 to the right, pushing one slide from elevator 7 into trough 3 and one slide from trough 3 into elevator 6 which is now down. This slide in the action just mentioned, pushes the slide last exhibited from elevator 6 into a recess 31 in frame, and against the front wall 32 of vertical recess 31. The movement to the left of shaft 11 compresses spring 33 until catch 34 is released, by collar 27 striking the lug 35 on the catch 34, when the yoke 14 is driven leftward by the spring 33 causing clutch 15 to disengage pulley 13 and engage pulley 12 reversing the mechanism, and causing traveler 18 to start moving toward the right. During the motion of the plunger or shaft 11 and while the mechanism is reversing, the elevators remain stationary as the pin 21 has passed over the hump on lever 22. As the traveler now moves toward the right this pin again strikes the hump on lever 22 and causes the worm 24 to rotate this time in a reverse direction, owing to the drive now being through pulley 12, thus causing the elevators 6 and 7 to return to their original position of Fig. 3, i. e. 6 up and 7 down. A stop plate 36 on the side of the worm gear 26 is adapted to intercept pins 37 and 38 respectively, on the collars 39, 40 at the ends of the worm 24 and limits this motion in both directions.

As the elevator 6 rises toward its original upper position the lantern slide in the recess 31 is forced out by the springs 41 and drops down into the lower trough 4, one of the slides being shown at X, in the position to which it has fallen. It is arrested in its fall and prevented from falling hard enough to do any damage by the springs 42. When the traveler in its rightward movement, strikes the collar 20 the plunger 30 is withdrawn and plunger 43 being mounted on a yoke 44 attached to side rods 45 to which the plunger 30 is also attached, moves in. This motion forces the lantern slide X into the lower trough and this pressing on the other slides moves them along said trough so that the left hand slide is pushed onto elevator 7. The slide at X, when pushed into the trough 4, passes beyond the springs 42 where it is held by these springs. When the traveler strikes collar 20 the mechanism is reversed as before and the traveler resumes a leftward movement. It will be seen that the length of time a picture will be exhibited may be regulated by moving the collar 20 along the shaft 11.

A worm 46 on the shaft 9 drives a gear 47 and through pulleys and belts 48, 49, the pulley 50, which imparts reciprocating movement to the shaft 51 through a crank pin 52, engaging a slot in an arm 53 depending from the shaft. Swung on this shaft but held longitudinally by the collars 54, 55 pinned on the shaft, is the reciprocator 56 adapted to engage the screws 57 on the lantern slide holders and give a reciprocating movement to the lantern slides. This member 56 is swung free on the shaft 51 and has a curved under surface to prevent damage if one of the screws 57 on the slide holder strikes it as the slide rises into position.

The shutter 58 is operated by means of an arm 59 on the end of the cross shaft 8', operating an arm 60 pivoted to the frame and connected with the shutter by a rod 63, so as to shut off the light while the lantern slides are changing, but is raised out of the line of light when the slide comes to exhibiting position. The fingers 61 attached to the elevators 6 and 7 are for the purpose of retaining the slides in the troughs when the elevators are not opposite the ends of the troughs.

The motion through which the plate holders pass is as follows: Supposing the elevator 6 is up and the elevator 7 down, as shown in Fig. 3. The slide or picture plate on elevator 6 is being exhibited, this slide resting on said elevator 6. Elevator 6 lowers and elevator 7 rises, resulting in lowering the slide which has just been exhibited opposite to and in front of the upper trough 3 and raising a slide by elevator 7 opposite to and in rear of the trough 3. The plunger 30 now acts, pushing the slide from elevator 7 into trough 3 and pushing a slide onto the elevator 6 and the exhibited slide from elevator 6 into the space 31 where it is supported above the shoulders 51* pressed by the springs 41. The elevator 6 now goes up and the elevator 7 goes down. As soon as this occurs the springs 41 push the exhibited slide from recess 31 into line with the vertical runway 31ª and said slide falls. When this takes place the front plunger 43 moves the exhibited slide back into the trough 4 and this pushes all the slides in this trough leftward and the end one at the left gets onto the elevator 7, ready to be raised into line with the upper trough 3. The rear plunger being connected with the front plunger by the side rods 45 moves rearward when said front plunger pushes all the slides in lower trough 4, thus removing itself from over the lower elevator 7 so that this may now raise the rear slide. The stops 37, 38 on the worm 24 are for preventing the worm from wedging into the worm wheel. The stops act against a plate oscillating with the worm wheel.

In the operation of the machine, the lever 22 is operated by the nut 18 in both directions to change the direction of movement of the worm. The nut strikes the lever and throws in the clutch 23 to operate the worm wheel 24 to operate the elevators 6 and 7. The nut continuing its movement leftward strikes against the collar 19 on the lower sliding rod 11 and compresses the right hand spring 33 thereon to put the main clutch lever 14 under tension while it is still held by its dog or catch 34. By coming against the left hand collar the nut moves the lower slide rod leftward, compressing the spring, as stated above, by making the collar 27 on the slide rod work against the said spring, this action continuing until the last mentioned collar strikes and releases the dog 34 and then the main clutch lever is quickly thrown by the spring to release the right hand belt wheel 13 from the shaft 9 and throw in the left hand belt drive wheel 12 to change the direction of the main shaft 9.

It will be observed that the lever 22, which operates the worm clutch, has a cam shaped end for the nut 18 to work on and on the movement (of the nut) to the left, the lever is operated to throw in the clutch 23 and then the nut passing on leftward releases the lever so as to ease up on the clutch after it has performed its work of operating the elevators, to lower the exhibited picture plate by the downward movement of elevator 6 and to raise the plate on the elevator 7. After the nut has completed its functions on its leftward movement of first throwing in the worm clutch to operate the elevators, as just described, and releasing the worm clutch and then operating the main clutch to reverse the movement of the worm clutch, it moves rightward and it then operates the worm clutch lever 22 again to throw the clutch in, causing the worm to rotate in a reverse way to operate the elevators, i. e. to raise elevator 6 to lift a fresh plate to exhibiting position and to lower elevator 7 to position to receive another plate. The nut now continues its travel to the right and finally strikes the right hand collar and moves the lower slide bar to the right, thus compressing the left hand spring 33' and finally bringing a collar 27' on this slide rod against the left hand dog 34', thereby releasing the clutch arm 14, which, under the action of the compressed spring 33', throws the right hand belt wheel into action (releasing the left hand wheel) and causing the worm carrying shaft to reverse its motion to the direction first described, but idly until the nut goes leftward again and throws the worm clutch lever 22. The position of the right hand collar 20, against which the nut strikes, determines the length of time any picture slide will remain up because the nut by striking this collar changes the drive from one pulley to the other and thus changes the direction of the screw, and consequently the time that the nut begins again its leftward travel, toward the worm clutch lever, which in turn determines by being struck by the nut, the time that the worm clutch will operate to lower the picture.

The nut 18, it will be observed, performs a plurality of functions. By its action on the lever 22 it determines the times and duration of operation of the elevators. By its action on the collars 19 and 20 it determines the times of reversing the main shaft 9 and it also determines by said action on the collars 19, 20 the times of operating the plungers 30 and 43 which shift the picture plates to and from the elevators and troughs.

The screws 57 may be adjusted to secure proper register of the screen member with the picture carrying member of the composite lantern slide, and for this purpose I provide screw drivers 62 mounted in the frame and adapted to be turned by finger pieces 63". The screw drivers are normally held retracted by springs 64 and when they are used they are pressed lengthwise against the tension of the spring 64 so that their ends may engage the heads of the screws 57 and then by turning the drivers the screws will be adjusted.

In Fig. 4 I show a modification of the connection for giving reciprocating movement to the rod 51 and the reciprocator 56, this connection involving a screw device 66. In this modified form the shaft 51 carries on its end the bar 65 which has near its lower extremity a hole with a female thread engaging the threaded shaft 66. This shaft is mounted between the frame 1 and the bracket 67 and carries on its outer end a sprocket wheel 68 by means of which it is driven, through the chain 69, sprocket 70, gear 47 and worm 46 from the reversing shaft 9. It will be seen that the motion of this shaft, running as it does, first in one direction and then in the other will through these connections cause the screw shaft 66 to turn in a similar manner and will so drive the shaft 51 and reciprocator 56 from side to side.

I claim as my invention:

1. In combination in a lantern slide display apparatus, an upper and a lower trough or receptacle for the slides, an elevator moving vertically from the lower portion of the upper trough to carry a slide up to the display point, an elevator moving vertically at the rear of the lower trough to carry a lantern slide from the rear of the lower trough to a point in rear of the upper trough, plungers for moving the slides in the upper trough forwardly and for moving the slides in the lower trough rearwardly, a vertical runway at the front of the troughs, a recess connected with said runway to receive the exhibited slide and means adjacent said recess to force the slide into the runway to drop by gravity when the upper elevator rises and means for operating the elevators, substantially as described.

2. In combination in a lantern slide display apparatus, an upper and a lower trough or receptacle for the slides, an elevator moving vertically from the lower portion of the upper trough to carry a slide up to the display point, an elevator moving vertically at the rear of the lower trough to carry a lantern slide from the rear of the lower trough to a point in rear of the upper trough, plungers for moving the slides in the upper trough forwardly and for moving the slides in the lower trough rearwardly, a vertical runway at the front of the troughs, a recess connected with said runway to receive the exhibited slide and means adjacent said recess to force the slide into the runway to drop by gravity when the upper elevator rises and means for operating the elevators, said means adjacent the recess consisting of a spring member to press on the exhibited slide, substantially as described.

3. In combination in a lantern slide display apparatus, an upper and a lower trough or receptacle for the slides, an elevator moving vertically from the lower portion of the upper trough to carry a slide up to the display point, an elevator moving vertically at the rear of the lower trough to carry a lantern slide from the rear of the lower trough to a point in rear of the upper trough, plungers for moving the slides in the upper trough forwardly and for moving the slides in the lower trough rearwardly, a vertical runway at the front of the troughs, a recess connected with said runway to receive the exhibited slide and means adjacent said recess to force the slide into the runway to drop by gravity when the upper elevator rises and means for operating the elevators, and springs at the lower end of said runway to cushion the fall of the exhibited slide and to act as detent means for said slide when it is pushed rearwardly by the front plunger, substantially as described.

4. In combination in a display apparatus, an upper and a lower receptacle or trough, elevators at the front and rear of said troughs respectively, means for operating the elevators to lift a lantern slide from the upper trough to the display point and from the lower trough to the rear of the upper trough, plungers for moving the slides along the troughs, said operating means for the elevators comprising vertical racks connected therewith and gear wheels meshing with the racks with means for operating the said gears first in one direction and then in the other, each gear meshing with a rack of each elevator, substantially as described.

5. In combination in a display apparatus with the upper and lower troughs for holding lantern slides, elevators operating respectively in front of the upper trough and in rear of the lower trough, means for operating the said elevators, each elevator having depending portions to act as stops for the slides in the troughs when said elevators are raised, substantially as described.

6. In combination upper and lower troughs for holding lantern slides, elevators operating respectively at front and rear of said troughs, plungers operating longitudinally of the troughs, a main drive shaft, means for driving said shaft in one direction and then in the other, means for operating the elevators from said drive shaft, a clutch controlling said operating means, a screw shaft driven in unison with the main shaft, a traveler or nut mounted on the screw shaft, means for throwing the clutch in or out, said means being operated from the traveler or nut and means for operating the plungers, substantially as described.

7. In combination upper and lower troughs for holding lantern slides, elevators operating respectively at front and rear of said troughs, plungers operating longitudinally of the troughs, a main drive shaft, means for driving said shaft in one direction and then in the other, means for operating the elevators from said drive shaft, a clutch controlling said operating means, a screw shaft driven in unison with the main shaft, a traveler or nut mounted on the screw shaft, means for throwing the clutch in or out, said means being operated from the traveler or nut and means for operating the plungers, said plunger operating means being operated by the said traveler or nut, substantially as described.

8. In combination upper and lower troughs for holding lantern slides, elevators operating respectively at front and rear of said troughs, plungers operating longitudinally of the troughs, a main drive shaft, means for driving said shaft in one direction and then in the other, means for operating the elevators from said drive shaft, a clutch controlling said operating means, a screw shaft driven in unison with the main shaft, a traveler or nut mounted on the screw shaft, means for throwing the clutch in or out, said means being operated from the traveler or nut and means for operating the plungers, said plunger operating means being operated by the said traveler or nut, and means for controlling the reversing driving means of the main shaft from the said traveler or nut, substantially as described.

9. In combination upper and lower troughs for holding lantern slides, elevators for shifting said slides from trough to trough and from the upper trough to the display point, means for operating the elevators, a drive shaft connected with said operating means, a clutch controlling said operating means, reversing driving means for the drive shaft, a screw shaft driven in unison with the driving shaft, a traveler or nut operated by the screw shaft, a lever controlling the clutch operated from the nut or traveler, a rod along which the traveler moves, adjustable collars mounted on the rod, plungers for moving the lantern slides along the troughs, a connection between the said plungers and the said rod whereby the sliding of said rod by the nut striking the collars will operate the said plunger mechanism, substantially as described.

10. In combination upper and lower troughs for holding lantern slides, elevators for shifting said slides from trough to trough and from the upper trough to the display point, means for operating the elevators, a drive shaft connected with said operating means, a clutch controlling said operating means, reversing driving means for the drive shaft, a screw shaft driven in unison with the driving shaft, a traveler or nut operated by the screw shaft, a lever controlling the clutch operated from the nut or traveler, a rod along which the traveler moves, adjustable collars mounted on the rod, plungers for moving the lantern slides along the troughs, a connection between the said plungers and the said rod whereby the sliding of said rod by the nut striking the collars will operate the said plunger mechanism, a controller for the reversing driving mechanism, detents for holding said controller, and springs for placing said controller under tension, said detents and said springs being controlled by the said sliding rod, substantially as described.

11. In combination in a display apparatus, means for bringing lantern slides to the display point automatically and removing them therefrom, a member having reciprocating movement to operate the lantern slide at the display point, said member having free pivotal movement to yield under contact from the lantern slide when moved in place, said pivotal movement allowing the said member to adjust itself automatically into operative position in connection with said slide and means for giving the said pivoted member its reciprocating movement, substantially as described.

12. In combination means for moving display slides to the display point, a pivotally mounted member to operate the display slide, means for reciprocating the said member axially, said member engaging the lantern slide yieldingly to adjust itself on its pivot into proper connection with the slide, substantially as described.

13. In combination in a display apparatus, means for moving the lantern slides automatically to the display point and removing them therefrom, a reciprocating member at the display point to engage and operate the slides, means for automatically operating said member and a shutter automatically operated to obstruct or permit the display of the slide, substantially as described.

14. In combination in a display apparatus, upper and lower troughs, elevators operating in connection therewith, a drive shaft, means for operating it first in one direction and then in the other, a connection between the said drive shafts and elevators, including a clutch, a screw shaft driven in unison with the drive shaft, a traveler or nut on the screw shaft, means for controlling the clutch arranged to be operated by the said nut on either direction of the nut's movement, plungers for shifting the lantern slides in the troughs and means for operating the said plungers, substantially as described.

15. In combination the upper and lower receivers for the lantern slides, means for pushing the slides through the receivers, an elevator moving from the lower part of the upper receiver to move the slides to a display point above the upper receiver, an elevator for moving the slides from the lower receiver to the upper receiver and means for operating the elevators located at a point between the vertical planes in which the elevators move and having connection with said elevators, and means for reversing the action of the elevator operating means, substantially as described.

In testimony whereof, I affix my signature in presence of two witnesses.

SYDNEY B. AUSTIN.

Witnesses:
W. A. HARMAN,
G. S. BAILEY.

---

Copies of this patent may be obtained for five cents each, by addressing the "Commissioner of Patents, Washington, D. C."